Aug. 23, 1949.  E. S. TRUE  2,479,705
POWER CONVERSION SYSTEM AND APPARATUS
Filed Aug. 23, 1946  4 Sheets-Sheet 1

INVENTOR.
Edwin S. True
BY
Albert G. McCaleb
Atty.

Aug. 23, 1949.　　　　　　　E. S. TRUE　　　　　　2,479,705
POWER CONVERSION SYSTEM AND APPARATUS
Filed Aug. 23, 1946　　　　　　　　　　　　　4 Sheets-Sheet 2

INVENTOR.
Edwin S. True
BY
Albert G. McCaleb
Atty.

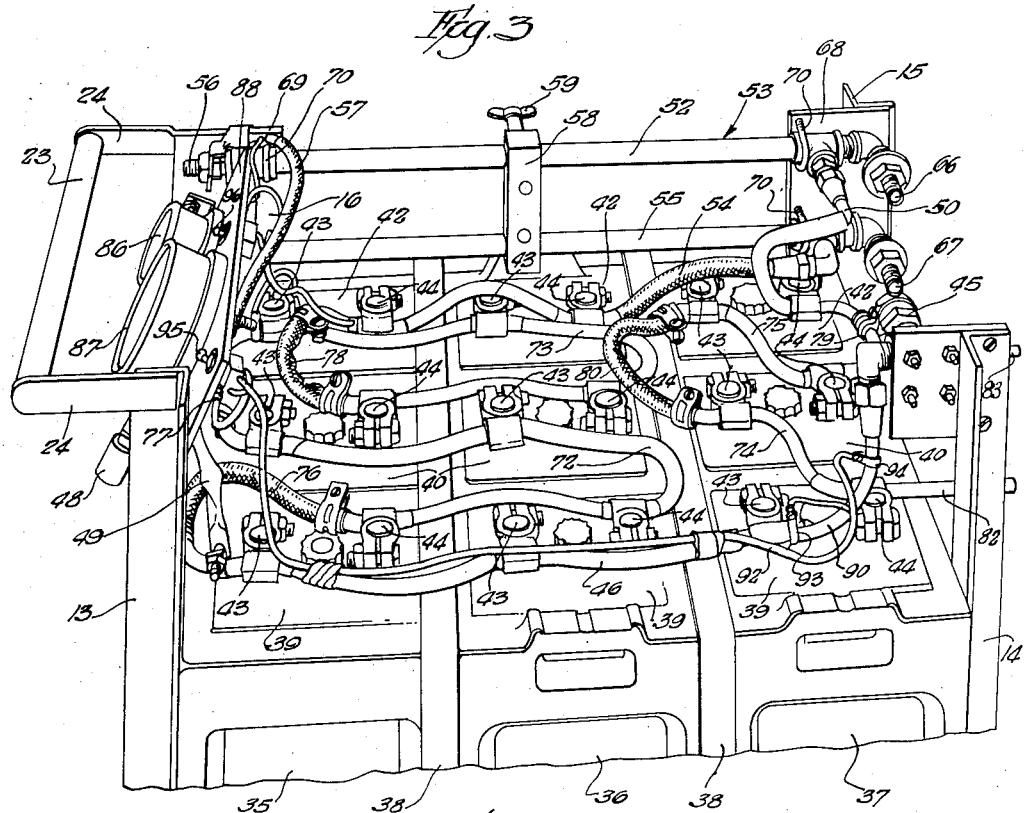
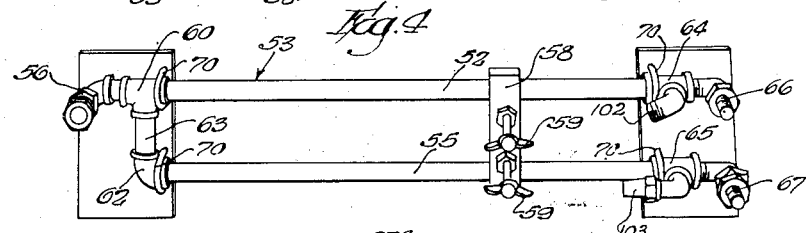
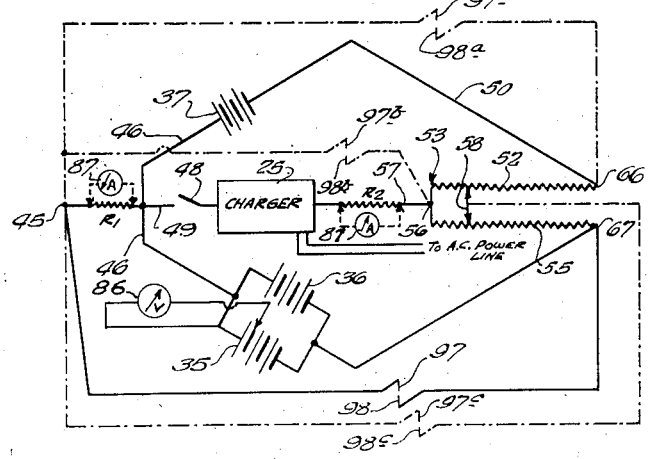

Aug. 23, 1949.　　　　　E. S. TRUE　　　　　2,479,705
POWER CONVERSION SYSTEM AND APPARATUS
Filed Aug. 23, 1946　　　　　　　　　　　　4 Sheets-Sheet 4

INVENTOR.
Edwin S. True
BY
Albert S. McCaleb
Atty.

Patented Aug. 23, 1949

2,479,705

UNITED STATES PATENT OFFICE 2,479,705

POWER CONVERSION SYSTEM AND APPARATUS

Edwin S. True, Oak Park, Ill., assignor of one-half to Joseph Waitcus, Chicago, Ill.

Application August 23, 1946, Serial No. 692,672

17 Claims. (Cl. 320—15)

This invention relates to welding systems and apparatus of the type suited to electrical welding and particularly to electrical spot welding.

One of the more general objects of my present invention is to provide an electrical welding system and apparatus adapted to a wide variety of uses and which may be utilized in most localities and locations without making any special provisions for sufficient source of power.

Another general object of my invention is to provide a welding system and apparatus suited to spot welding and which are designed to avoid excessively high peak power demands and poor load factor.

My present invention further comprehends the provision of a system and apparatus for electrical spot welding which not only has the advantages which have been heretofore mentioned, but which is also readily adjustable to suit a variety of jobs and uses.

As another object my invention contemplates the provision of a compact and durable power conversion unit for use in electrical spot welding, which unit is adapted to furnish preselected high values of welding current at intermittent and relatively short periods and to receive electrical energy from a power source at a relatively even rate during and between the welding periods.

In order to effect ease of adjustment of my power conversion unit to suit it to the effective welding of different kinds and weights of materials, it is an object of my invention to provide an electrical system embodying a secondary power source and a current dividing circuit including a readily variable resistance unit so connected that it controls the maximum and instantaneous values of welding current during each welding operation.

My invention additionally includes the provision of an electrical system for spot welding which embodies a current dividing circuit incorporating a plurality of secondary power sources of different sizes so connected that they receive electrical energy from a common source, although the circuit may be varied to alter amount and rate at which each of said sources contributes to the system for welding purposes, whereby the welding current value and power may be selected to suit a given job.

As another object the invention contemplates the provision of a welding system wherein secondary batteries are used for stored energy power conversion, and a unique system of relatively small water-cooled conductors serves to establish the electrical connections between the batteries as well as the cells thereof, and to maintain a uniform low temperature and correspondingly uniform resistance values.

It is to be understood that the term "welding" as used herein, is to be interpreted in a broad sense as applied to all forms of bonding metals, including processes sometimes referred to as "soldering," "brazing" or "plating."

Other objects and advantages of the invention will be apparent from the following description and the accompanying drawings in which similar characters of reference indicate similar parts throughout the several views.

Referring to the drawings, of which there are four sheets:

Fig. 3 is a fragmentary perspective view looking downwardly and toward one side of the power conversion unit shown in Figs. 1 and 2;

Fig. 4 is a perspective side view of a portion of the apparatus depicted in Figs. 2 and 3;

Fig. 5 is a schematic circuit diagram which illustrates my preferred electrical connections for the welding system and apparatus disclosed herein;

Considered generally, my preferred welding system and apparatus embodies a unitary power conversion unit having a plurality of storage batteries and a battery charging unit connected in a circuit such that each contributes to the supply of relatively high values of direct current at comparatively low voltage to suitable welding electrodes. The current output capacity of the battery charging unit is such that it contributes an appreciable amount of current to the welding electrodes during welding operations and charges the storage batteries during the periods between such welding operations. For flexibility in use in the welding of different kinds and weights of materials, I prefer to divide the storage batteries into groups having substantially equal voltage ratings and different current output capacities and to interconnect the storage batteries and the battery charging unit through a rheostat in such way that the proportionate amounts contributed by each of the battery groups and the battery charging unit may be adjusted to effect the desired current output characteristics. Such variation of the current output characteristics supplements variations which are accomplished through the timing of the welding operation either manually or by an automatic timing device. With my preferred circuit connections the welding electrodes may also be connected at different places to the power conversion unit to effect an additional variation of the output current characteristics.

Figure 1:
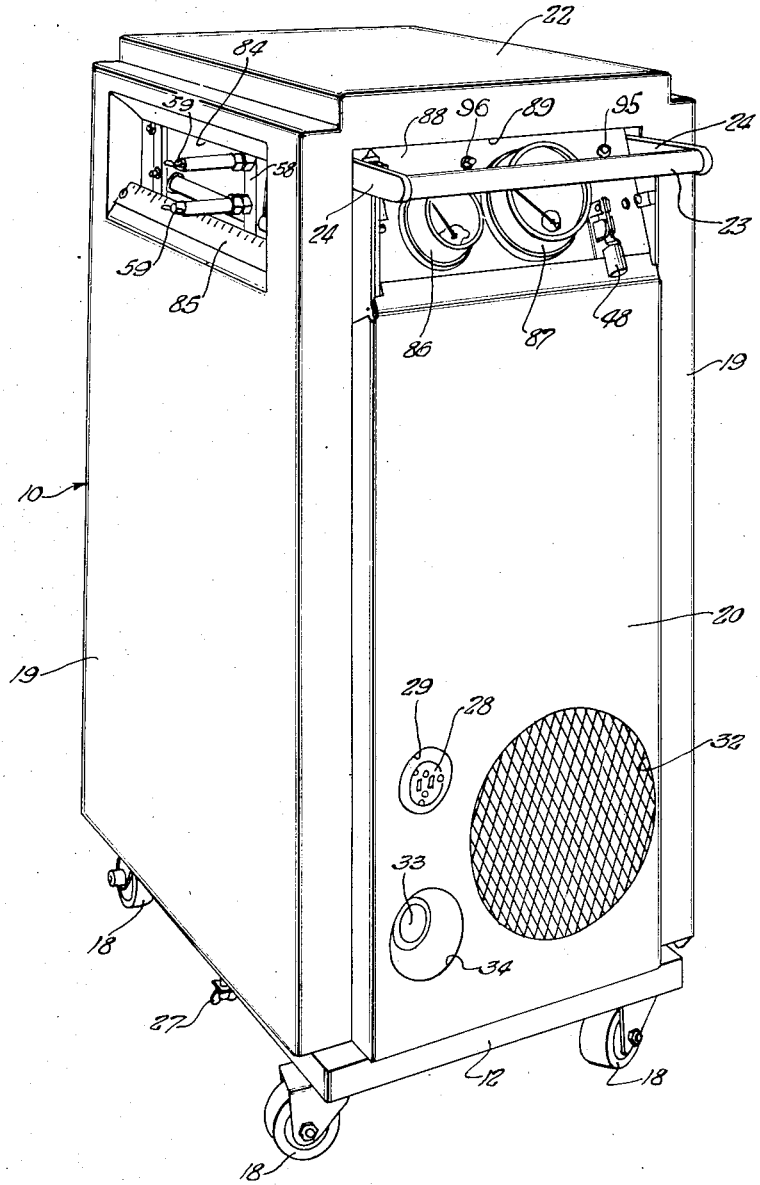
Fig. 1 is a perspective view taken from in front and to one side of a unitary power conversion unit adapted to use in electric welding and embodying a preferred form of my present invention.
Figure 2:
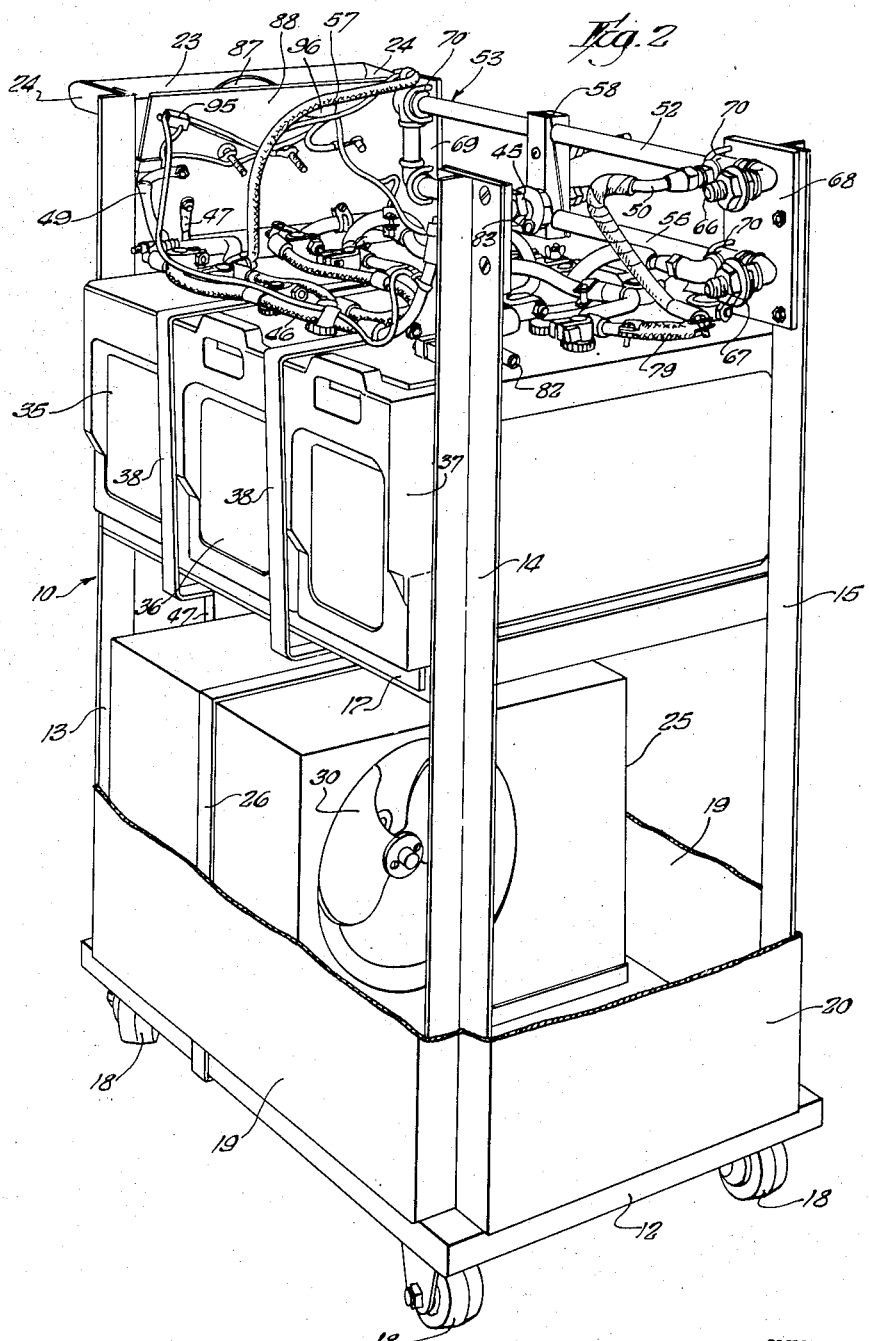
Fig. 2 is a perspective view of the power conversion unit shown in Fig. 1 taken from the rear and toward the side opposite that shown in Fig. 1 and wherein most of the outer housing is removed to show the internal structure of the unit.

Referring more particularly to the preferred embodiment of my invention which is depicted in the accompanying drawings for exemplary purposes, I have shown in Figs. 1 and 2 a unitary power conversion assembly which is adapted to be connected to a suitable commercial source of alternating current and to provide high values of direct current at relatively low voltage to any desired size and type of welding electrodes. In my presently disclosed embodiment the power conversion unit is carried by a supporting structure including a base 12 having upright support posts 13, 14, 15 and 16 secured to the corners thereof and carrying a shelf structure 17 at a position above the base and below the tops of the support posts. By preference, casters 18 support the base so that the unit may be readily moved from place to place.

As depicted in Fig. 1, side, end and top panels 19, 20 and 22 fit over the outer surfaces of the support posts to provide a housing for the unit. Also I prefer to provide a handle 23 near the top of at least one end of the unit and secured to the support posts 13 and 16 by outwardly projecting arms 24.

A battery charging unit 25 is mounted on the base 12, and, in the present instance, is secured in place by a metallic strap 26 which extends over the top of the unit, as shown in Fig. 2, and is secured at its ends to the base by fastening means, such as bolts and co-acting wing nuts 27 (Fig. 1). This battery charging unit may be any one of a variety of types which usually incorporate a transformer and a rectifier unit for converting an available alternating current to a direct current at suitable voltage for charging the batteries at a desired rate. The alternating current is connected to the battery charging unit through an adapter 28 (Fig. 1) which is accessible through an opening 29 in one of the housing end walls 20.

For the present purpose the output rating of the battery charging unit is desirably such that it will not only charge the batteries during the periods between welding operations but will also contribute an appreciable amount to the welding current during the welding operations. For power conversion units of the size contemplated, the battery charging unit is provided with an electrically driven fan 30 for circulating cooling air across the operating parts of the battery charging unit while it is in operation. To facilitate the flow of this cooling air, I have provided openings such as 32 in the end walls 20 of the housing on opposite sides of the fan 30. I have also found it desirable that the current output of the battery charging unit 25 shall be variable and manually adjustable within predetermined limits. For effecting such variations, the battery charging unit is equipped with a suitable regulator controlled by means such as a knob 33 accessible through an opening 34 in one of the end walls 20 of the outer housing.

As depicted in Figs. 2 and 3, a plurality of heavy duty storage batteries 35, 36 and 37 are carried by the shelf structure 17 above the battery charging unit 25 and are clamped in place thereon between the support posts by means such as straps 38 which overlie adjacent edges of the batteries. In the present instance the batteries 35, 36 and 37 are similar and each includes a plurality of cells 39, 40 and 42 as shown in Fig. 3. Each such cell has a pair of output terminals 43 and 44.

As previously mentioned, and for the purpose of lending flexibility to the output current characteristics which are available from my power conversion unit for a desired purpose, I prefer, in the electrical connections of the cells to divide those cells or batteries into groups, which groups have substantially the same output voltage rating but different output current characteristics. Having reference to Figs. 3 and 5, wherein the circuit connections of the batteries are depicted in their physical form and schematically, the three batteries which are utilized in the present instance have one common terminal connector 45 which serves as one of the output terminals of the voltage conversion unit and is connected to terminal posts 43 of like polarity on each of the batteries 35, 36 and 37 by a conductor 46. One of the output leads 47 of the battery charging unit 25 is also connected to that terminal connector 45 through a switch 48 and a lead 49 clamped onto the conductor 46.

The cells of the batteries 35 and 36 are connected in series-parallel circuit relationship, while the cells of the battery 37 are connected in series circuit relationship. Since the number of cells in each of the batteries 35 and 36 which are connected in series-parallel relationship is equal to the number of cells in the battery 37, the voltage ratings of the two groups of batteries thus connected are substantially equal. However, the series-parallel connection of the cells of the batteries 35 and 36 provides a greater output current capacity than that of the single battery 37 having its cells connected in series.

The other end terminal of the battery 37 is connected by a conductor 50 to one end of a resistance leg 52 of a rheostat 53, while the other end terminals of the series-parallel connected batteries 35 and 36 are connected through a conductor 54 to a second resistance leg 55 of the said rheostat. The other ends of the resistance legs 52 and 55 are electrically connected together and are provided with a terminal connector 56 which serves as a fixed mid-tap on the rheostat to which the other output lead 57 of the battery charging unit is connected. It may therefore be understood that the battery 37 and the series-parallel connected batteries 35 and 36 are effectively connected in parallel relationship with the battery charging unit through the resistance legs 52 and 55 respectively of the rheostat 53.

As shown in Fig. 4, the resistance legs 52 and 55 of the rheostat 53 are disposed in substantially parallel relationship to one another so that a movable clamp-type contactor 58 may be manually moved to various positions along the resistance legs and secured in any desired position by fastening means such as screws 59. Since the resistance legs 52 and 55 are connected together at one end, the movement of the contacter 58 along the resistance legs changes the proportionate amounts of the legs which are connected in parallel so as thereby to vary the resistance values in the circuit between the batteries and between each of the batteries and the battery charging unit.

Since the values of current utilized in welding are relatively high, the actual resistances of the legs 52 and 55 may be relatively small for effecting substantial control but they must have high current carrying capacity and should remain substantially constant in resistance for consistency of operation. With these factors in mind, I have made the resistance legs 52 and 55 of substantially straight pieces of tubular resistance material, such as pipe, interconnected at one end through suitable couplings 60 and 62 and a short pipe 63. At their other ends the resistance legs are provided with T couplings 64 and 65 to which terminal posts 66 and 67 respectively are secured. The rheostat is supported relative to the support posts 15 and 16 and at opposite ends by insulating blocks 68 and 69, respectively, which are each secured to one of the posts and have the ends of the resistance legs secured thereto by fastening means, such as U-bolts 70.

In order to counteract the heating effect of the current flow through the rheostat and thereby to maintain the resistances of the parts thereof at substantially uniform values during operation, I prefer to provide a flow of coolant through the tubular legs thereof. For effecting such a coolant flow, I have provided couplings 102 and 103 which communicate with the resistance legs 52 and 55 through the fittings 64 and 65 so that coolant may flow from one coupling to the other through the resistance legs and the connecting pipe 63.

In addition to cooling the rheostat 53, I also prefer to cool the conductors which interconnect the cells of the batteries and to do this in a manner such that both the rheostat and the connecting conductors for the batteries are cooled by a single continuous flow of coolant. A single conductor 72 interconnects terminals 44 of the cells 39 and terminals 43 of the cells 40 on batteries 35 and 36. Conductor 50 connects terminal 44 of cell 42 to the resistance leg 52 of the rheostat. A similar conductor 73 interconnects terminals 44 of cells 40 and the terminals 43 of cells 42 on those same batteries, while the conductor 54 connects the terminals 44 of the cells 42 in addition to connecting those terminals to the resistance leg 55 of the rheostat. On the battery 37 the cells are connected in series by conductors 74 and 75. The conductors 46, 72, 73, 54, 50, 75 and 74 are all tubular and the connections of the conductors 54 and 50 to the legs of the rheostat are such that they provide fluid communication as well as electrical connections to those legs.

Since the voltage of the batteries and particularly the voltages between cells is low, I have found it entirely practical to interconnect the tubular conductors for the batteries by flexible insulating tubes or hoses which are in each instance clamped to the ends of the conductors for fluid-tight connections thereto; that is, one end of the conductor 46 is connected to one end of the conductor 72 by a hose 76. The other end of the conductor 72 is connected to one end of the conductor 73 by a hose 77. The other end of the conductor 73 is connected to the end of the conductor 54 by a hose 78. On the battery 37 the end of the conductor 50 is connected to one end of the conductor 75 by a hose 79 and the other end of the conductor 75 is connected to one end of the conductor 74 by a hose 80. The other end of the conductor 74 is extended as indicated at 82 in Figs. 2 and 3 to provide one fluid flow connection to an end of the series of conductors and hoses. The other end connection is indicated at 83 in Fig. 2 and is provided by a fitting on the terminal post 45 to which the conductor 46 is connected. Thus it may be understood that a coolant such as water flows into one end of the connected system of conductors and hoses, as at the fittings 83, and from there flows through the tubular conductors, hoses, and rheostat legs in the following sequence: 46, 76, 72, 77, 73, 78, 54, 55, 52, 50, 79, 75, 80, 74, and thence to the fitting extension 82.

For convenience in adjustment during the use of the power conversion unit, the rheostat 53 is mounted along one side thereof and the screws 59, by which the movable contactor 58 is locked in place or freed for movement, extend outwardly through an opening 84 in one side wall of the outer housing, as shown in Fig. 1. For convenience in resetting the movable contactor to a predetermined position, a scale 85 may be attached to the outer surface of the housing side wall adjacent the opening 84.

In the disclosed embodiment of my invention I have also provided for the visual indication of the operation of the power conversion unit by meters 86 and 87 mounted on a panel 88 at the top of one end wall 20 of the outer housing and exposed through an opening 89 therein. The meter 86 provides an indication of the battery cell voltage of one pilot or indicator cell 42 in battery 35. Meter 87 provides an indication of either the charging rate or current output of the battery charging unit 25, or the total current output of the power conversion unit. As is quite common in the measurement of currents of the magnitude encountered in apparatus of the type disclosed, I utilize a millivoltmeter for measuring current values by connecting the millivoltmeter 87 across a calibrated resistor in the circuit. In the instance of measuring the total current output of the power conversion unit, a section 90 (Fig. 3) of the conductor 46 is calibrated and utilized for the resistor across which the meter 87 is connected. A pair of insulated conductors 92 has ends 93 and 94 connected to the conductor 46 at opposite ends of the calibrated section 90 and affords the connection to the meter 87 through a double pole double throw toggle switch 95. In like manner the meter 87 may be connected across a section of the output lead 57 through the toggle switch 95. By operating toggle switch 95 to one position or the other, the rectifier output or the total output is measured. By operating toggle switch 96 the meter 86 may be made to indicate the pilot cell voltage with the charger "on" or "off," as desired. The sections of the conductors 46 and 57 across which the meter 87 may be connected by operation of switch 95 are indicated as resistors R1 and R2 respectively in the circuit diagram of Fig. 5.

In any instance during use of the power conversion unit, one welding electrode 97 (Fig. 5) is preferably connected to the common terminal connector 45. However, the other welding electrode 98 may be connected to different parts of the circuit to obtain variations in the welding current characteristics. As shown in solid lines in Fig. 5, the electrode 98 is connected to the terminal post 67 at the end of the resistance leg 55. Alternative electrode connections are indicated in the circuit diagram of Fig. 5 in dot and dash lines. In each instance, as previously mentioned, one electrode is connected to the common terminal connector 45 as indicated at 97a, 97b and 97c. However, in each of those instances the other electrode is connected to a different part of the current dividing circuit on the opposite side of the batteries and charging unit. In one instance the electrode is connected to the terminal post 66 as indicated at 98a. In another instance it is connected to the mid-tap of the rheostat as indicated at 98b; while in another instance it is connected to the movable contactor 58 on the rheostat as indicated at 98c.

With any of the depicted connections for the welding electrodes it may be observed that both groups of batteries and the battery charging unit each contribute to the total welding current although the proportionate amounts contributed by each are different because of the different intervening resistance values. The total amounts of power contributed to the welding electrodes by each of the batteries and the battery charging unit are also varied by the different circuit connections of the electrodes as a result of the difference of the load carrying characteristics of the two groups of batteries. For instance, with the electrodes connected as indicated at 97a and 98a, they are connected directly across the battery 37, while the connection to the batteries 35 and 36 and that to the battery charging unit are through portions of the rheostat which are dependent upon the setting of the movable contactor 58. Since the battery 37 has a lower load carrying capacity than the parallel connected batteries 35 and 36 and the latter batteries contribute to the output through the resistance legs of the rheostat, the output power will be somewhat less than would be provided by the electrode connections indicated at 97 and 98 with the other circuit constants remaining the same. In the latter instance the electrodes are connected across the parallel connected batteries 35 and 36 which have a higher normal power output capacity.

With the electrodes connected as indicated at 97b and 98b, both groups of batteries contribute their proportionate amounts of the welding current through the resistance legs of the rheostat. The connections of the electrodes indicated at 97c and 98c provide a considerable amount of flexibility for adjustment since one of the electrodes is connected to the movable contactor 58 of the rheostat. The variations of the welding electrode connections which are possible with my preferred current dividing circuit add considerable flexibility to the adjustments which may be accomplished by varying the charging current rate and the position of the movable contactor on the rheostat to suit the welding current values and characteristics to a wide variety of materials and weights of material.

The use of my disclosed power conversion unit requires only the connection of the output terminals thereof to suitable welding electrodes, the connection of the battery charging unit to a commercial alternating current source of power and the connection of the water cooled conductors to a source of water and a drain. Since the required amount of water is small, the connections to the water cooled conductors may be made through temporary hose connections if desired. Also, since the power supply line contributes only a small proportion of the total welding current demand during any one welding operation and spreads the accumulation of the welding power by charging the batteries over periods of time, the instantaneous load demands of my power conversion unit are not such that they require special power supply connections as is the case with many types of welding equipment. The preferred rectifier characteristics for use in the disclosed circuit provide a fairly uniform output wattage at rated output voltage and current while charging the batteries, and a lower voltage but correspondingly higher output current while supplying current to the output load. This provides a load factor and maximum current demands which are satisfactory in most any location. Furthermore, since my power conversion unit supplies direct current to the welding electrodes, the welding efficiency of the power output of my power conversion unit is high.

The water cooling of the battery connecting leads not only maintains the resistances of those leads at low values, but also has a tendency to keep the battery plates cooled by the heat conduction through the terminal posts. By my preferred system of connections for the batteries and the rheostat, the cooling of both the battery leads and the rheostat is effected by a single continuous flow of the cooling water.

Figure 6:
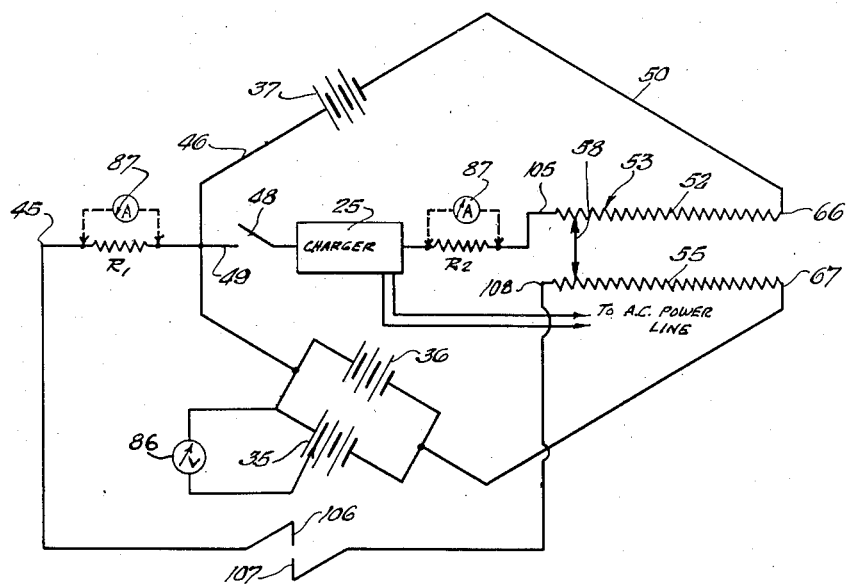
Fig. 6 is a schematic circuit diagram similar to Fig. 5, but illustrating a modification of my invention.
Figure 7:
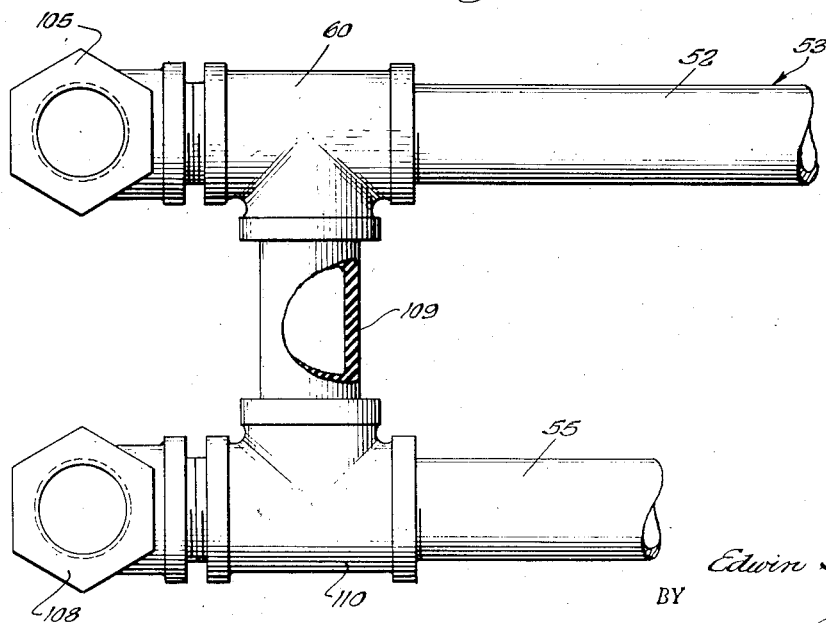
Fig. 7 is a fragmentary front elevational view, drawn to an enlarged scale, and depicting a modification of the structure shown in Fig. 4.

In the modified forms of my invention depicted in Figs. 6 and 7, reference numerals similar to those previously used designate corresponding parts. The illustrated variations of the circuit shown in Fig. 6 center around differences of the rheostat connections and resulting changes in its operation. Fig. 7 provides an example of structure which may be utilized for carrying out the circuit changes of Fig. 6 without foregoing the cooling of the rheostat legs by a flow of coolant.

As will be observed from a comparison of Figs. 5 and 6, the rheostat legs in Fig. 5 have a mid-tap connector 56; while in the circuit of Fig. 6, the resistance legs 52 and 55 of the rheostat 53 are directly connected only by the movable connector 58.

In the modified circuit shown in Fig. 6, one side of the battery charging unit 25 is connected to an end terminal 105 of the resistance leg 52. There being no mid-tap connection between the ends of the resistance legs 52 and 55, as in Fig. 5, the output load or welding electrodes 106 and 107 are connected across the common terminal connector 45 and an end terminal 108 of the resistance leg 55. Such connections of the battery charging unit 25 and the electrodes 106 and 107, which electrodes may be carbon electrodes utilized in brazing or the electrodes of a plating unit, have been found desirable for rendering the lower current and voltage values suitable for such purposes.

Fig. 7 shows a structural form of the rheostat which is adapted to uses such as that depicted in the circuit diagram of Fig. 6 without foregoing the advantages of the water cooling of the resistance legs 52 and 55 of the rheostat.

For purposes such as that aforementioned, an electrically insulating fluid flow connection is provided between the ends of resistance legs 52 and 55 by a tubular insulating member 109 made of a material such as Micarta and a T-coupling 110 on one end of the resistance leg 55.

While I have illustrated and described a preformed embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a power conversion system and apparatus, a unitary power conversion assembly adapted to be connected to a source of power for supplying high current at low voltage to a load and comprising, in combination, a support structure carried by casters and including a base and a shelf connected by support posts; a plurality of storage batteries of equal voltage rating carried by said shelf and each having the cells thereof connected in series; a battery charging unit mounted on said base and adapted to be connected to said source of power; a rheostat carried by said frame and including a mid-tap, resistance legs extending from the mid-tap and a movable contact element providing a variable connection between said resistance legs; said batteries, battery charging unit and rheostat being connected in a current dividing circuit wherein terminals of one polarity on said batteries and battery charging unit are connected together; said batteries being unequally divided with the majority thereof connected in parallel and to one extending leg of the rheostat; the remainder of said batteries being connected to the other extending leg of the rheostat; a second output terminal of the battery charging unit being connected to said mid-tap of the rheostat so that charging current flows to the batteries through said legs of the rheostat; and said rheostat and the common connection of said batteries and battery charging unit providing output connections for the power conversion assembly.

2. In a power conversion system and apparatus, a power conversion unit adapted to be connected to a source of power for supplying high current at low voltage to a load and comprising, in combination, a unitary enclosure having mounted therein a plurality of storage batteries of equal voltage rating, a battery charging unit adapted to be connected to said source of power, and a rheostat including resistance legs extending from a portion providing a mid-tap and a movable contact element providing a variable connection between the resistance legs; said batteries, battery charging unit and rheostat being electrically connected in a current dividing circuit which determines the current provided to the load by each of the batteries and the battery charging unit and wherein terminals of like polarity on each of said batteries and said battery charging unit are connected together, a part of said batteries being connected in parallel and to the end of one resistance leg of the rheostat, the remainder of said batteries being connected to the end of the other resistance leg of the rheostat, said battery charging unit having a second output terminal connected to the mid-tap of the rheostat so that charging current flows to the batteries through said resistance legs, and means electrically connected to said rheostat and to said connected terminals of the battery charging unit and batteries for providing output terminals for the power conversion assembly.

3. In a power conversion system and apparatus, a power conversion unit adapted to be connected to a source of power for supplying high current at low voltage to a load and comprising, in combination, a current dividing circuit having three branches, one of said branches including a rheostat having two resistance legs connected together at a mid-tap and a battery charging unit having output terminals, one of which output terminals is connected to said mid-tap, said battery charging unit having input leads adapted to be connected to said source of power, a second of said branches including a secondary battery of predetermined voltage connected across the output terminals of the battery charging unit through one of said resistance legs of the rheostat, the third branch of said circuit including a plurality of secondary batteries of said predetermined voltage connected in parallel and the said parallel connected batteries being connected across the output terminals of the battery charging unit through the other resistance leg of said rheostat, a connector movable along said resistance legs for varying the effective resistances thereof, and load current supply leads connected to said one of the branches of the current dividing circuit on opposite sides of the battery charging unit.

4. The combination defined by claim 3, and wherein one of the load current supply leads is connected to one of said resistance legs of the rheostat.

5. The combination defined by claim 3, and wherein one of the load current supply leads is connected to said connector.

6. The combination defined by claim 3, and wherein one of the load current supply leads is connected to said mid-tap on the rheostat.

7. The combination defined by claim 3, and wherein said resistance legs of the rheostat is tubular and has a fluid connection therebetween at said mid-tap, said batteries each have cells electrically connected by tubular conductors, and means including tubes of insulating material interconnect said rheostat and said tubular conductors to provide a passage for the flow of cooling fluid.

8. In a power conversion unit for an electrical system and apparatus and which is adapted to be connected to an alternating current power source and to furnish direct current to a load, the combination comprising a current dividing circuit including three branches, one of said branches comprising a rheostat having two resistance legs connected together at a mid-tap and a battery charging unit having output terminals, one of which output terminals is connected to said mid-tap, said battery charging unit also having input leads adapted to be connected to the alternating current power source, a second of said branches including a secondary battery connected to the output terminals of said battery charging unit through one of said resistance legs of the rheostat, the third of said branches including a secondary battery connected across the output terminals of said battery charging unit through the other resistance leg of the rheostat, and a movable connector for varying the effective resistances of said resistance legs of the rheostat.

9. The combination defined in claim 8, and wherein said secondary batteries having the same voltage ratings and different load carrying capacities, and means providing load current terminals connected to said current dividing circuit so as to receive current from both batteries and said battery charging unit.

10. The combination defined in claim 8, and wherein means providing load current terminals connected to said current dividing circuit so as to receive current from both batteries and said battery charging unit, and said movable connector providing an adjustment for varying the proportions of the load current provided by each of said batteries and the battery charging unit.

11. The combination defined in claim 8, and wherein said resistance legs of the rheostat being made of tubular resistance material, and means providing connections to said tubular resistance legs for the flow of coolant therethrough.

12. The combination defined in claim 8, and wherein said secondary batteries having cells, and the cells of each of said batteries being connected by tubular conductors, and means including tubes of insulating material interconnecting said tubular conductors for the flow of coolant therethrough.

13. In a power conversion unit adapted to be connected to an alternating current power source and to furnish direct current at low voltage to a load, the combination comprising a plurality of storage batteries and a battery charging unit, said battery charging unit having one output terminal connected to each of the storage batteries to provide one output connection for the power conversion unit, a rheostat, said battery charging unit having another output terminal connected to the storage batteries through said rheostat, and means including said rheostat for providing a second output connection for the power conversion unit and for regulating the current output of the power conversion unit.

14. In a power conversion unit for a welding system and apparatus and which is adapted to be connected to an alternating current source and to provide direct current for welding, the combination comprising a plurality of secondary battery cells, said cells being divided between two branches of a circuit, means for connecting said cells into groups with the cells of each group having substantially equal voltage ratings and unequal power delivering capacities, said groups being connected in parallel circuit relation through a resistance unit, means including said resistance unit for providing current output terminals for the batteries, and means for charging the batteries.

15. The combination set forth in claim 14 and wherein said resistance unit is provided with variable means for adjusting the relative output currents of the groups of cells.

16. In a power conversion unit adapted to be connected to an alternating current source and to provide direct current to a load, the combination comprising a plurality of secondary battery cells, said cells being divided into groups, means for connecting the cells of one group into series circuit relationship to provide a battery of predetermined rated voltage, means for connecting the cells of the other group into series parallel relationship to provide a battery of substantially the same predetermined voltage, said means in each instance comprising tubular conductors, and means including non-conductive tubes connecting said tubular conductors to provide a substantially continuous conduit for the flow of a cooling liquid through the tubular conductors.

17. The combination defined in claim 13, and wherein said rheostat comprehends a pair of resistance legs, and a common movable connector connecting said resistance legs and simultaneously varying its positions of connections thereto.

EDWIN S. TRUE.

REFERENCES CITED

The following references are of record in the file of this patent:

UNITED STATES PATENTS

| Number | Name | Date |
|---|---|---|
| 420,906 | Johnson | Feb. 4, 1890 |
| 720,350 | Hubbard | Feb. 10, 1903 |
| 720,351 | Hubbard | Feb. 10, 1903 |
| 746,289 | Chamberlain | Dec. 8, 1903 |
| 803,453 | Stevens | Oct. 31, 1905 |
| 1,183,264 | Woodrow | May 16, 1916 |
| 1,723,984 | Von Henke | Aug. 6, 1929 |
| 1,790,173 | Smith | Jan. 27, 1931 |
| 1,795,563 | Klock | Mar. 10, 1931 |
| 1,853,101 | Von Henke | Apr. 12, 1932 |
| 1,857,029 | Moser | May 3, 1932 |
| 1,967,801 | Woodbridge | July 24, 1934 |
| 2,031,975 | Northrup | Feb. 25, 1936 |
| 2,033,743 | Shoemaker | Mar. 10, 1936 |
| 2,282,923 | Ambruster | May 12, 1942 |
| 2,310,164 | Prendergast et al. | Feb. 2, 1943 |

FOREIGN PATENTS

| Number | Country | Date |
|---|---|---|
| 7,937 | Great Britain | May 8, 1891 |